United States Patent [19]
Howell

[11] Patent Number: 6,046,772
[45] Date of Patent: Apr. 4, 2000

[54] DIGITAL PHOTOGRAPHY DEVICE AND METHOD

[76] Inventor: Paul Howell, Howell Ltd., 477 Congress St., Portland, Me. 04101

[21] Appl. No.: 08/899,550

[22] Filed: Jul. 24, 1997

[51] Int. Cl.[7] .............................. H04N 9/04; H04N 9/07; H04N 5/225; G03F 3/08
[52] U.S. Cl. ....................... 348/273; 348/219; 348/266; 358/518
[58] Field of Search .................................. 348/242, 266, 348/273, 219; 382/162, 167; 358/518; H04N 9/07, 9/04

[56] References Cited

U.S. PATENT DOCUMENTS

| | | | |
|---|---|---|---|
| 4,642,678 | 2/1987 | Cok | 348/242 |
| 5,877,807 | 3/1999 | Lenz | 348/219 |

FOREIGN PATENT DOCUMENTS

| | | | |
|---|---|---|---|
| 62-61489 | 3/1987 | Japan | H04N 9/07 |
| 2-137590 | 5/1990 | Japan | H04N 9/07 |

*Primary Examiner*—Wendy Garber
*Assistant Examiner*—Andrew B. Christensen
*Attorney, Agent, or Firm*—Thomas L. Bohan & Associates; Thomas L. Bohan

[57] ABSTRACT

A combination of digital camera design and digital photography technique that allows a single digital camera to be used for both single-shot and multiple-shot color operation. The invention includes a digital camera half of the light-sensing elements of which—the "majority pixels"—are sensitive to a first primary color and the other half of which—the "minority pixels"—are divided about equally between those sensitive to a second primary color and those sensitive to a third primary color. Further, these light-sensitive elements are arranged so that by a simple lateral shift of the array, typically by the width of a single pixel, every one of the majority pixels will be moved into a position previously held by one of the minority pixels. When used in conjunction with known pixel-interpolation methods this camera produces single-shot digital images equal or better in color quality to any existing single-shot digital camera. Shooting a scene twice, with the array shifted as indicated above between the two shots, and using known interpolation techniques to determine all three primary colors at each pixel location, a final photograph essentially as good as any provided by traditional three-shot digital photography can be achieved. For cameras having the requisite array of photosensitive elements, but not incorporating a mechanism for moving the array separately from the rest of the camera, the present invention can be practiced by rotating the described camera about an axis lying in the principal plane of and passing through the principal point of the camera's lens.

11 Claims, 8 Drawing Sheets (a)

(b)

(c)

(d)

DIGITAL PHOTOGRAPHY DEVICE AND METHOD

BACKGROUND OF THE INVENTION

1. Field of the Invention

The present invention relates to the field of photography with digital cameras. More particularly, it relates to the field of fine studio photography using digital cameras and the need of its practitioners to have single-shot and multiple-shot digital cameras. More particularly yet, it relates to combining in a single digital camera (1) the capacity to perform the highest quality single-shot color photography and (2) the capacity to perform two-shot color photography that provides results comparable in quality to those obtained from the conventional three- or four-shot photography.

2. Prior Art

Digital cameras are rapidly replacing film cameras in many areas of photography. In the field of fine studio photography, the source of most advertising, catalogs, still-life portraiture, and the like, the replacement is essentially complete. This is because of the ease of image storing, editing, and display that digital photography provides.

"Digital camera" here will refer to any camera that can directly capture and store an image in computer-readable form. In general, such cameras have traditional optics, and, in fact, can be identical to film-cameras except for their image-capturing component. Whereas the former have film deployed at the focal plane, digital cameras have at the focal plane an array of electronic light-sensitive elements—typically semiconductor photo-sensors—that produce a light-intensity-dependent electric signal in response to being illuminated. The individual electrical signals so produced are then combined and stored in a computer file that can subsequently be used to reproduce and display the image that had appeared on the focal plane. (In this regard, the digital camera is much like the human eye, with its retinal array of photo-detectors that give rise to signals that are sorted out by the brain.) Commonly, it is a CCD (Charge-Coupled Device) that performs the operation of detecting light information and generating storable signals in digital photography. For brevity, the light sensitive array will occasionally be referred to here as a CCD. This is not meant to imply that there is any limitation of the present invention to cameras with CCDs, Rather, whenever "CCD" is used, it will be meant to refer to any and all types of electronic image-capturing devices usable in digital cameras.

It can be seen that the image captured by a digital camera will have a resolution limited by the density of the light-sensing elements deployed at the focal plane. The image can be described as made up of a matrix of picture elements ("pixels") equal in number to the number of light-sensing elements in the camera. Re-stated, the pixel density in the displayed image is proportional to the density of light-sensitive elements. As a form of shorthand, the word "pixel" is often used interchangeably to refer to either the light-sensing element or to the element of the image. The lateral distance from one such light-sensing pixel to the next adjacent one is called the "pixel pitch"; the resolution is often specified by stating the pitch or the pixel "width." This is depicted schematically in FIG. 1, which shows the light-capturing elements as an array of identical light-sensing elements, all marked with the letter 'P.' The image being focused on the array will then be recorded as a collection of pixels. No feature in the image smaller than a single pixel width will be resolved. (Note that—for illustrative purposes—the array has been rotated away from its actual orientation perpendicular to the optic axis. Note also that the 8×8 array shown here and elsewhere stands for an actual array hundreds or thousands of pixels on a side. Finally, note that a single one of the points being imaged on the focal plane is selected here as a surrogate for the entire image.)

This occurrence of a finite density of discrete pixels is not unique to digital photography. Images captured on film, in spite of the their usual appearance to the naked eye of being continuous, are themselves made up of a finite number (and density) of pixels. For example, a standard 4×5-inch ASA 100 film (negative) is made up of about 100 million pixels. And herein lies the primary downside of digital photography at present; at best, it produces images with about one one-hundredth the pixel density as images captured on standard film. If the image focused on the focal plane is thought of as having 100 million pixels, then using digital camera techniques rather than film results in a picture in which each pixel reproduces the average light of 100 pixels of the actual image. In spite of this limitation, it is possible to produce fine images with a digital camera, providing that one uses a camera equipped with as high a density of electronic sensor elements as possible. Of course, the greater that density the higher the price of the camera; typical prices for digital cameras of studio quality range from $30,000 on up. This factor plays a role in determining how to approach the problem of optimizing color quality in the images captured.

The unaided light-sensing elements do not distinguish between different colors of light; thus, an image captured by a simple array of these elements will be monochromatic. In order to capture the color data needed for reconstituting the image in color, one can use several primary color filters in succession as one records a series of photographs; each image captured will depict the scene as it appears in one primary color. Then, these images—each in one primary color—can be combined using electronic circuitry, typically software-controlled, to produce and display a final, composite image that is reasonably true in color distribution to the image that would be formed on the focal plane without any intervening color filters, i.e., a final image reasonably true to the colors of the scene being photographed. (In an attempt to increase color fidelity, more than three such color-filtered shots may be made. For example, in deference to the human eye's relatively higher sensitivity for green light, there may be one red, one blue, and two green shots.) FIG. 2 depicts schematically what is being done with the data obtained from the three separate images in order to obtain a full-color image at the maximum resolution available with the camera in question; every pixel (point) of the composite image has measured—as opposed, for example, to interpolated—color data for each of the three primary colors. (The only limitation on color fidelity is the precision with which the intensity of each primary color is measured at each point. Typically, for fine photography it will be measured with 12-bit precision, leading to 36-bit characterization of the color for that point in the composite image.)

There are clear limitations on the use of multiple-shot photography for reproducing true colors. For one thing, it is obvious that the scene being photographed must be a still life. Every point of every object in the scene must map onto the same pixel for each of the multiple shots. Furthermore, the light level of the scene must be the same for each of the shots; otherwise, the re-mixing of the colors will not result in a faithful reproduction of the scene's color. Note further that, because of equipment limitations, the three shots cannot be taken in rapid succession; with the digital photography methods currently in use, 20 seconds or so must elapse between shots, primarily due to the time required for picture data to be loaded into the storage medium. (Also, a certain time is required for the CCD to re-charge). This can create additional work when one is performing high quality photography, since even using professional flash systems it is often not possible to provide the same illumination for each of the three shots. The result is a color shift, something that is not acceptable in professional reproductions and must therefore be manually tuned out for each image in which it appears, a time-consuming activity. In spite of these disadvantages, the three-shot CCD camera is preferred for high-quality photography of subjects that must exhibit no color aliasing, such as will often be produced in single-shot digital photography, as described immediately below.

Because of the limitation of the multiple-shot technique to scenes that are absolutely still, the consumer-level digital camera and all digital cameras intended for action photography must be capable of capturing color information with a single shot. This is done by matrix filtering of the light-sensitive elements (in contrast with the global color filtering done with the multiple-shot cameras). For example, each of these elements may be painted with a red, a blue, or a green filter. This obviously reduces the spatial resolution of the final image by a factor of three. Assume that the three primary colors are red, green, and blue and denote the three corresponding sets of light-sensing elements the "red pixel set," the "green pixel set," and the "blue pixel set," respectively. The matrix may consist of stripes or columns of pixels filtered for each of the three different primary colors, or it may be a more complicated mosaic. Also, reflective of the human green sensitivity, the green pixels may have a proportionately higher representation.

Color aliasing—the appearance of false color or a pattern of false colors in the image associated with abrupt spatial variance in light intensity in the scene being photographed—is a particularly serious (because particularly noticeable) artifact in color images produced with the single-shot digital camera. It results from the fact that at any particular point in the focal plane of the single-shot camera the intensity of only one of the primary colors of the image is being sensed, whereas, to reproduce the actual image color at a point, one needs to have the respective intensities for all three primary colors. The light intensities for the two primary colors not actually measured at that point need to be inferred from their respective values at nearby points. That is, an interpolation of some sort must be performed in order to assign intensity values to the two colors not directly sensed at the point of interest. For definiteness, assume that just a one-dimensional interpolation is carried out and that the sequence of pixels along a horizontal line at the focal plane is of the simple repeating pattern: RGBRGBRGBRGB . . . , such as would be the case when the array of light-sensing elements consisted of a series of columnar stripes of red pixels, green pixels, and blue pixels. As an example of the interpolation, consider performing it at the location of one of the green pixels. As can be seen, one position to the left and two positions to the right of each green pixel is a red pixel. The interpolation may be as simple as finding the weighted average of the values of the signal from each of those two red pixels. (E.g., the signal coming from the red pixel one position to the left may be given twice the weight as that coming from the red pixel two positions to the right.) Then a similar procedure is carried out to get the interpolated blue value at the position of the green pixel in question. This yields a level for red, green, and blue at that point. These levels will then be mixed by the camera and/or computer so as to produce the "actual" color at that point. And so on for all of the other points in the array. The final product will be an image with a total pixel number equal to the total pixel number (red plus green plus blue) at the focal plane. However, this "interpolated resolution" is not true resolution; the true resolution in this example is lower by a factor of three. Actually, this type of interpolation is reasonably good as long as the scene being photographed does not change greatly over a short distance, that is, as long as the image does not have light levels that vary sharply within a distance on the order of the pixel pitch.

As an example illustrating the basis of the color aliasing problem, consider a single row of light-sensitive elements, on which the image changes abruptly in intensity over a distance approximately equal to the pixel pitch. The table below is a representation of the three types of pixels, with the intensity given (in arbitrary units) for each pixel at the point in the line where it exists. The line itself would have a continuing sequence of RGBRGBRGB . . . , consistent with the pixels being arrayed in vertical stripes (columns), the pixel configuration used in at least one of the single-shot digital cameras presently marketed. Although in the depiction below the R, G, B are shown on different horizontal lines, this is done for the purpose of clarity in the depiction; they are actually all in the same line, extending from position (POS) 1 through POS 17.

| POS | 1 | 2 | 3 | 4 | 5 | 6 | 7 | 8 | 9 | 10 | 11 | 12 | 13 | 14 | 15 | 16 | 17 |
|-----|---|---|---|---|---|---|---|---|---|----|----|----|----|----|----|----|----|
| R   | 10|   |   | 1 |   |   | 9 |   |   | 12 |    |    | 12 |    |    | 12 |    |
| G   |   | 15|   |   | 13|   |   | 11|   |    | 14 |    |    | 13 |    |    | 12 |
| B   |   |   | 15|   |   | 14|   |   | 13|    |    | 12 |    |    | 14 |    |    |

At POS 4 there is a red pixel, and hence actual red data, but no green or blue pixel. One standard interpolation to get the green level at 4 is to do a weighted average of its measured value at POS 2 (i.e., 15) and its measured value at POS 5 (i.e., 13). The same thing would be done with blue, using its measured value of 15 at POS 3 and its measured value of 14 at POS 6. The three-color mix produced at POS 4 of the displayed image would be something like (RGB)= (1, 13.3, 15.7). But the rapid change in R suggests that there is a large change in the image's overall brightness over a very short distance; perhaps at POS 4 the image contains a black dot. The simple interpolation just described would not produce that very low intensity point, but would give a high luminous-intensity point of false color, in this case the complement of red. Just as false-color image anomalies will occur for isolated dark spots in the object being photographed, so, too, isolated bright spots will lead to image anomalies in intensity and color.

There are means of dealing with isolated spots, dark or bright, in the image. In particular, an interpolation refinement based on luminous intensity variation can be used to "smooth" out the light values in the image. It is a form of blurring or fuzzing of the image that is acceptable if one is dealing with random (non-periodic) singularities of the type just described. In this discussion, "luminous intensity" will be used to refer to what us commonly called "brightness," whether it be in the image or in the scene being photographed.)

Although the above-described electronic image processing serves to eliminate or minimize image errors arising from isolated, random bright or dark spots in the object, it cannot be used when the scene to be captured contains periodic intensity fluctuations such that when the pattern is focused on the focal plane the periodic fluctuations occur over a distance on the order of a single pixel. In such a case the untreated disturbance (false colors) arising from a straight RGB interpolation may extend over tens or hundreds of pixels, a far greater area of the image than one would want wish to "fuzz out." Almost without exception, it is in photographs of manmade objects that such periodic light fluctuations exist and give rise to false colors in Moiré-like patterns in the resulting single-shot image, that is, the "color aliasing" just described. One example of color aliasing is familiar to color television viewers, whose monitors have an array of red, green, and blue pixels similar to that of a digital camera intended for single-shot operation. (In the television monitor instance, the pixel emits red, green, or blue light in response to being struck by high-energy electrons sent toward the monitor screen by the incoming television signal.) Whenever a scene being televised in color has an object in it with a fine pattern—epitypically, the herring-bone-design sport coat of the weather announcer—the viewed image contains that pattern surrounded by a rainbow of false colors that appears to dance around as the object moves. "Anti-aliasing" techniques are used in the video industry in order to minimize this effect, but can never be completely successful as long as the current color television broadcast/display standard is employed.

So, the division of the available light-sensing elements into three sets for the single-shot camera can increase resolution-related problems both quantitatively and qualitatively. An additional problem arising from the traditional approach of producing color photographs with digital cameras is that even relatively small studios need to have both a single-shot and a three-shot camera. As should be clear by this point, the multiple-shot—typically three-shot—camera will be needed whenever the highest color quality is demanded and the scene is a still-life with a continuous lighting level. The three-shot camera will have be set aside in favor of a single-shot camera for all motion shots and for those scenes having low or varying light levels. High quality digital cameras, whether of the single-shot or three-shot variety, are expensive. Having to own two cameras, therefore, is a heavy burden for a small studio. Furthermore, with the digital photography technology rapidly improving, it is not possible to purchase the two cameras only once; there must be a continual upgrading, with two cameras purchased each time to take full advantage of the new technology in a manner that will enable one to compete successively in the field. Thus, a major goal is to develop a digital camera that can be used in both the single-shot mode and the multiple-shot mode without materially compromising the image produced in either. An ancillary goal is to be able to introduce such a system to existing single-shot cameras.

One prior-art approach to combining the three-shot digital camera with the one-shot digital camera is to start with a one-shot camera as described above, that is, a camera with a matrix of light-sensitive elements divided into three sets. To use this camera in the multiple-shot mode, one mounts it in such a way that the CCD can be shifted by one pixel at a time with respect to the image, e.g., by the use of a piezoelectric linear driver coupled to the CCD stage. (Many high quality digital cameras presently in use have a voltage input connected to such a piezoelectric device.) If the color filter matrix array is such that it has two-pixel lateral translational symmetry, and if, for the second shot, the image is shifted one pixel to the left on the CCD and, for the third, an additional pixel to the left, then red, green, and blue data will have been collected for each point of the image. The appropriate software then can in principle reassemble the information so as to produce and display an image that has the same color fidelity achievable by the earlier-described three-shot procedure. This will work regardless of whether the pixel array is arranged in columns or in rows, as long as the one-pixel shifts are lateral or vertical, respectively.

One serious disadvantage of the combined single-shot/multiple-shot camera system just described is the constraint imposed on the pattern of the red, green, and blue pixels. Deploying them in parallel rows or columns rather than in a more complex mosaic makes the camera more vulnerable to artifacts arising from repetitive features in the object being photographed. That is, it makes it more likely that in the single-shot mode color aliasing and analogous image defects will occur. Thus, although such a design allows fine three-shot color photographs to be made with a single-shot camera, it seriously compromises the quality of the camera used in its single-shot mode.

Of course, if one produced a single camera with three CCD chips, there would be no need of the three-shot mode. All color data would be recorded at each pixel location for every shot (assuming the proper three-way optical routing of the image). But this is no solution, since it is the CCD chip that makes the high-resolution digital cameras so expensive. The three-chip/single-shot camera entails more expense than the present practice of having two separate cameras: one multi-shot and one single-shot.

Therefore, what is needed is a combined single-shot/multiple-shot digital camera capable of giving high-quality images in either mode. What is also needed is that such a combined camera be affordable by the small studio owner. Finally, what is needed is a method by which most existing digital cameras can be converted into such a combined single-shot/multiple-shot camera.

SUMMARY OF THE INVENTION

The present invention provides a combined single-shot/multiple-shot digital camera with (1) the capability of capturing in single-shot operation color images equal in quality to the best of those available with current individual single-shot digital cameras and (2) the capability of capturing in two-shot operation color images that are nearly as high in quality as the best of the present three-shot digital cameras. The present invention further enables most single-shot cameras presently in use to be converted to a dual-mode camera containing the advantages of the referenced combined camera.

The present invention is based in part on the fact that the human eye is much more sensitive to spatial variations in the luminous intensity (and thus on the variation in brightness across the surface of an object) than it is to spatial variations in the color (such as the variation in hue across the surface of an object). Specifically, the present invention uses the fact that small differences in the brightness of points near to one another—as in a scene to be photographed—are much more apparent to the human eye than are small differences in color. A subsidiary basis of the present invention is the dominance of the color green in a scene, due to its position near the center of the visible spectrum. This circumstance means that nearly everything in a scene to be photographed can be viewed through a green filter, something that is not true for red filters, which just pass light in the long wavelength end of the visible spectrum, or for blue filters, which do the same for light at the short wavelength end. (Nevertheless, the basic inventive concept here described can utilize any set of three complementary primary colors and utilize any one of that set as the primary color on which the interpolation normalization is based.)

In accord with the principles set out above, the color matrix in the present invention is based on a unit cell of primary colors that is a mosaic in which half the pixels are one primary color and the rest are divided equally between the two complementary primary colors. FIG. 3 shows the focal plane tiled (tessellated) in accord with this rule, using a particular set of primary colors: red, green, and blue. (FIGS. 5(a) through 5(d) show various unit cells that comply with the rule.) It can be seen that with the array of FIG. 3, a one-pixel shift laterally or vertically will map a green onto every location that prior to the shift was occupied by red or blue. In this way, two photographs will serve to record the image in one primary color for every pixel position. It is only necessary that in between the two photographs the light-sensing array is shifted with respect to the image by one pixel, either vertically or horizontally. In brief, the digital camera of the present invention can be operated in a two-shot mode or a single shot mode. The electronic circuitry/software used to combine the two images produced in the two-shot mode uses the luminous intensity of a particular primary color at all locations in the image to produce an integrated/interpolated image that comes close to the color quality and resolution of the conventional three-shot images, while providing the additional benefit of shortening the time required to capture the data. Furthermore, when used in the single-shot mode, the pixel array of the present invention produces an optimal single-shot photograph. None of the current single-shot cameras will produce a better final image, and some (in particular, the prior-art combined single-shot/multiple-shot camera) produce images that are inferior.

There are a number of known methods for providing the required one-pixel shift of the light-sensing array. For example, in many cameras presently in use there is an external jack provided through which one can apply a voltage to a piezoelectric cell coupled to the CCD so as to physically move the CCD laterally with respect to the rest of the camera. As one alternative to moving the CCD with respect to the rest of the camera, a careful rotation and/or translation of the camera can serve the same purpose, that of shifting the CCD with respect to the image focused on it. For those cameras lacking the capacity to independently shift the CCD, these whole-camera-moving alternatives are used to practice the present invention. One such means is described in the Preferred Embodiment.

BRIEF DESCRIPTION OF THE DRAWINGS

FIG. 5(a) depicts the base of the preferred embodiment of the present invention.

PREFERRED EMBODIMENT OF THE INVENTION

Figure 5:
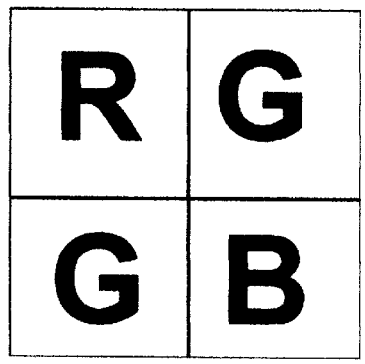
FIGS. 5a–d. Illustrations of several tiling (tesselation) bases for use with the present invention.
Figure 5:
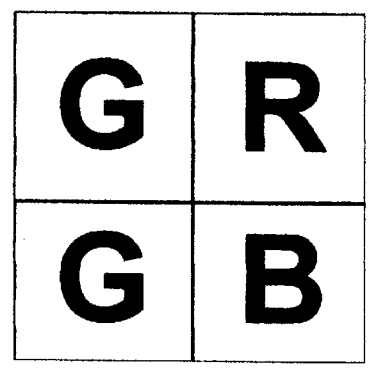
Figure 5:
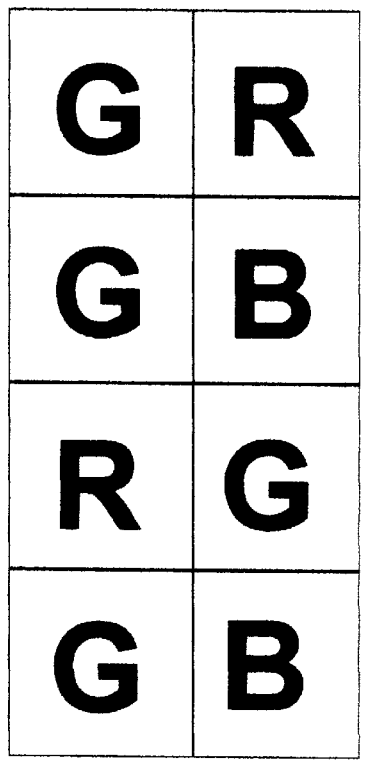
Figure 5:
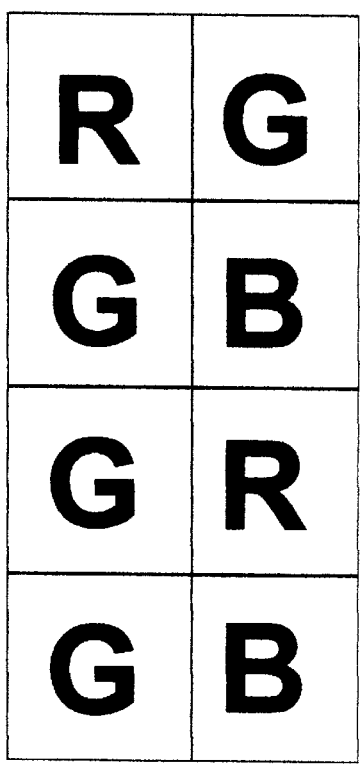

The Preferred Embodiment of the present invention uses the red, green, blue set of complementary colors in its color matrix. The matrix is designed so that for a single photograph half of the light-sensing elements in the CCD array will receive green light and the other half will be divided symmetrically into those receiving red light and those receiving blue light. FIG. 5(a) depicts the unit tesselation cell of colors used in the Preferred Embodiment. Note the nature of the array resulting tiling of that cell across the focal plane. Starting with it in any particular position and shifting it one pixel laterally or vertically will cause a green pixel to move into every space occupied pre-shift by a red or blue pixel. The unit cells shown in FIG. 5(b) through FIG. 5(d) will produce arrays that produce this mapping after a lateral shift, but not after a vertical shift.

Figure 1:
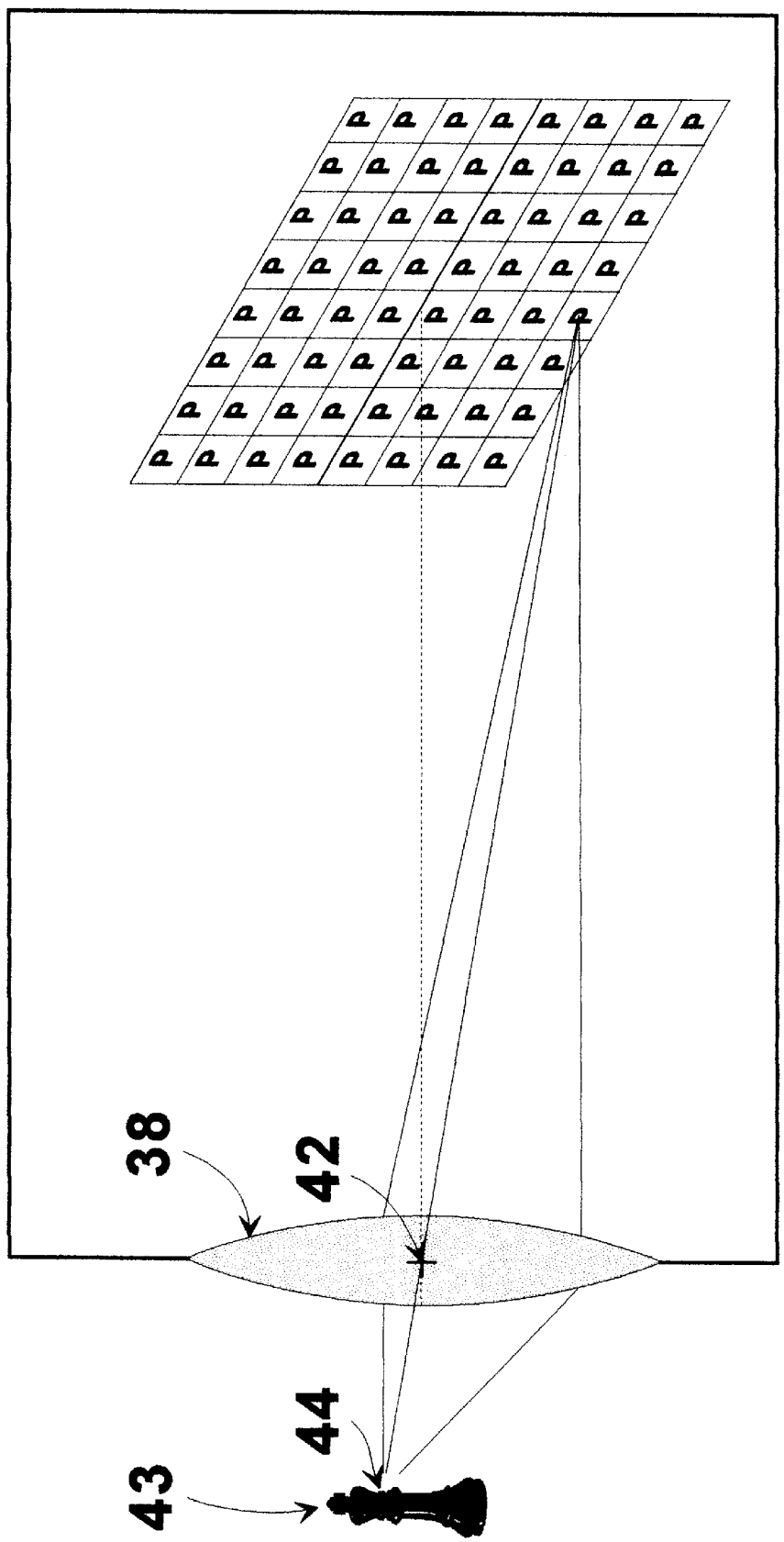
FIG. 1. (Prior Art) Schematic depiction of basic operation in digital photography, showing a general array of light-sensors deployed on the focal plane of a camera (array is perpendicular to optic axis, but is shown here at an angle so as to highlight its contents).
Figure 2:
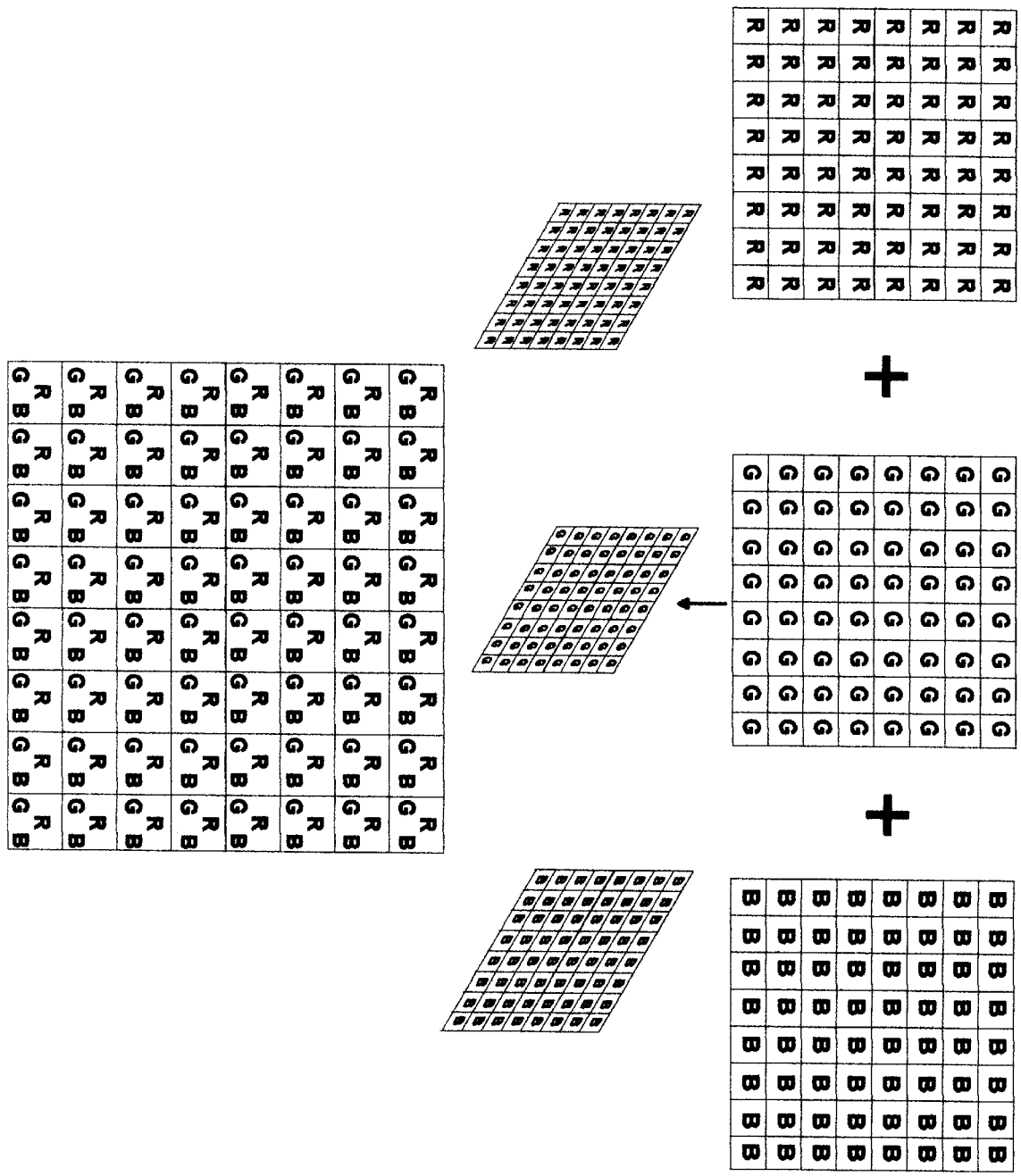
FIG. 2. (Prior Art) A schematic depiction of the general way in which prior-art three-shot camera provides all three primary colors for each point in the array. That is, it shows 100% red, green, and blue coverage with no interpolation.
Figure 3:
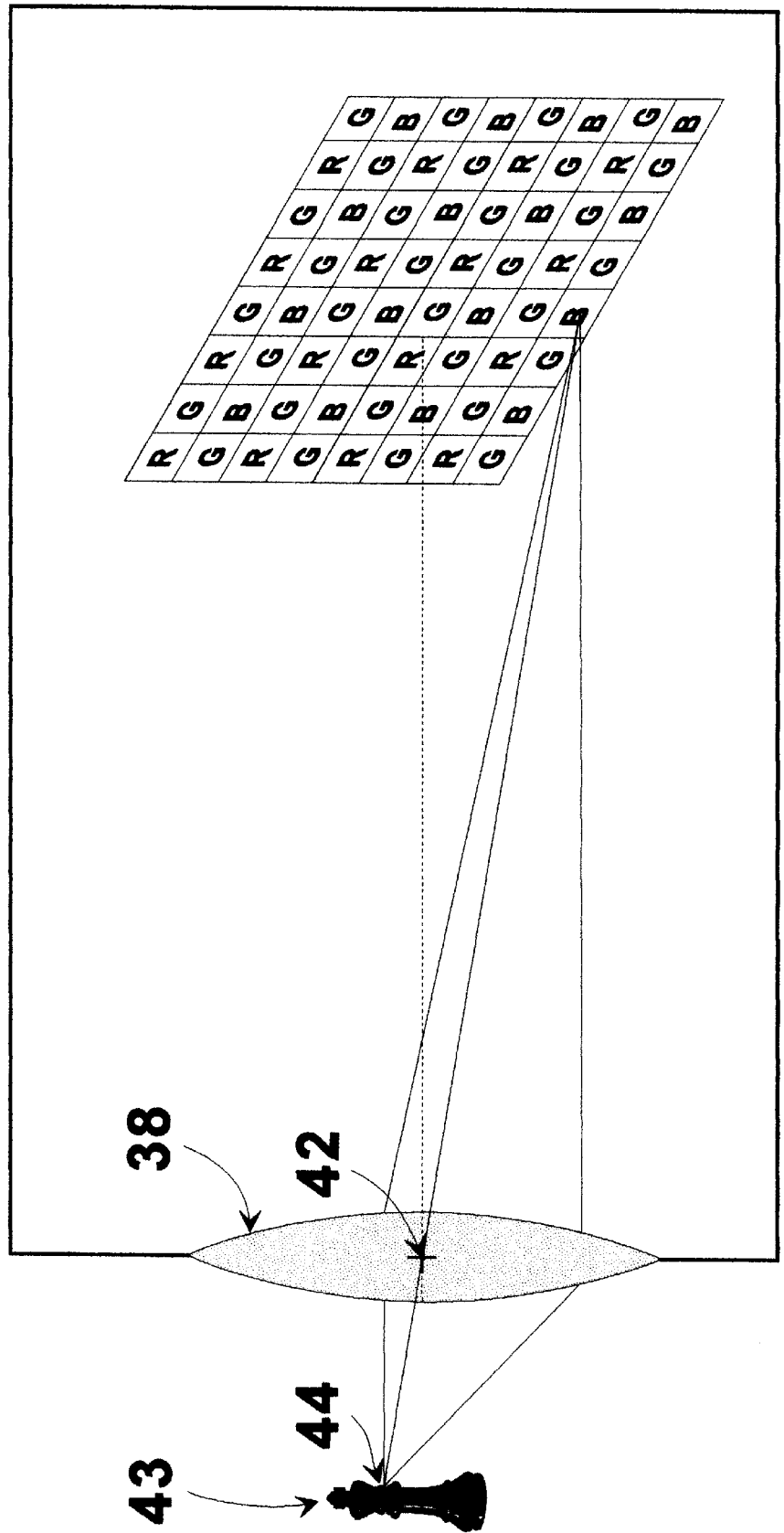
FIG. 3. (Prior Art) Schematic depiction of digital camera configured for single-shot operation by matrix filtering of the light reaching the light-sensor array at the focal plane (array is perpendicular to optic axis, but is shown here at an angle so as to highlight its contents).
Figure 4:
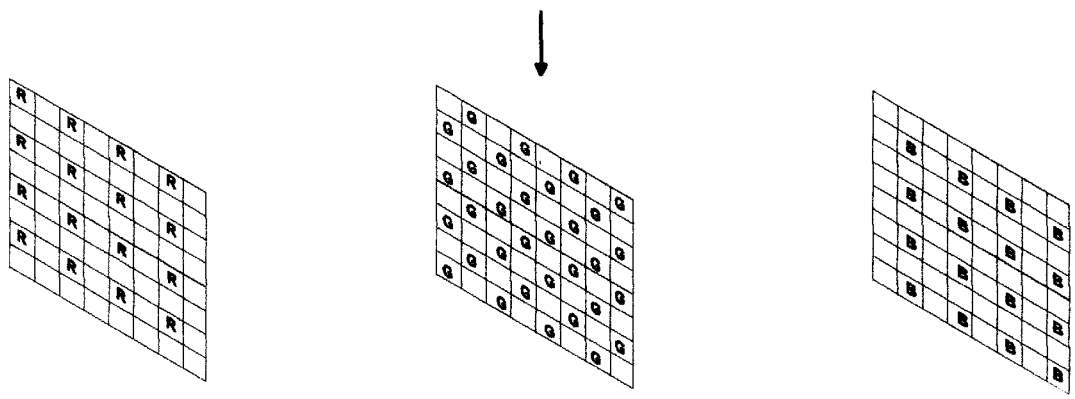
FIG. 4. A schematic depiction of the way in which the three-color pixels are deployed in the camera of the Preferred Embodiment of the present invention.

FIG. 4 shows the distribution of actually-measured color data, as well as that which needs to be interpolated, after a single shot using the digital camera of the Preferred Embodiment of the present invention. The bottom array in FIG. 4 emphasizes the actually-measured data (solid letters), and that needing to be interpolated (letter outlines), for each point in the array. It can be seen that every point in the array either contains actually-measured green data or is surrounded by pixels having actually-measured green data. By well-known techniques, using software or other means, the data not actually measured at a given pixel will be interpolated. For example, consider the matrix element outlined in bold in FIG. 4. It has actually-measured blue data, leaving green and red to be interpolated. Each of the four matrix elements sharing sides with the bold element (its four "nearest neighbors") have actually-measured green data to be used for interpolation. Moreover, each of the four "next-nearest neighbors" (elements located along diagonals through the element of interest) contain actually-measured red data. This is an optimum array for single-shot digital photography. Various interpolation schemes using the actual data can be used, for example, the bi-cubic scheme or even something as simple as the methods set out earlier in this specification.

Figure 6:
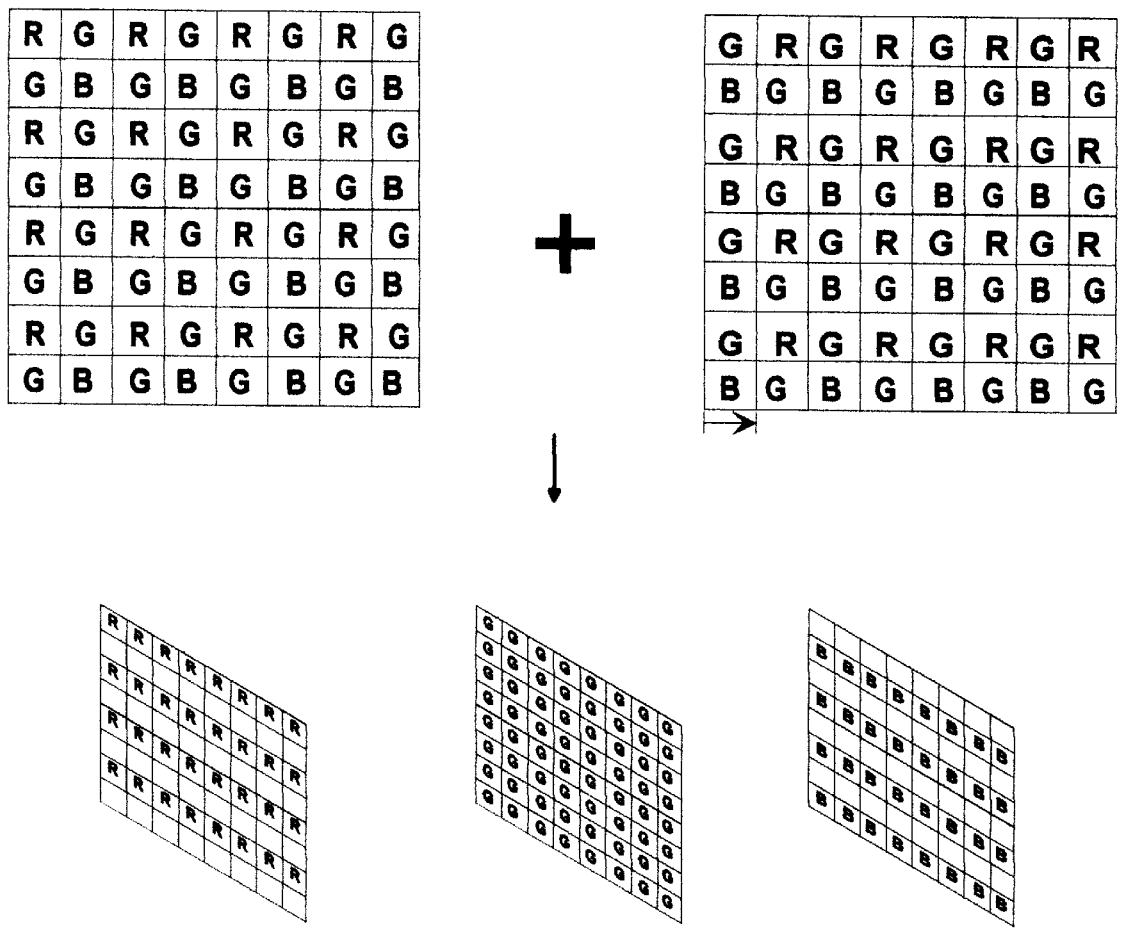
FIG. 6. A schematic depiction of the way a digital camera having a color matrix filter in accord with the preferred embodiment of the present invention is operated in a two-shot mode.

FIG. 6 shows the data that the camera of the Preferred Embodiment of the present invention captures in two-shot operation. The positions of the array for the two shots are shown, respectively, by the two arrays at the top of FIG. 6, the ones joined by an addition sign (the 8×8 arrays being intended to represent an internal sub-array of the actual array, itself hundreds or even thousands of pixels on a side). The array on the right can be seen to result from a one-pixel shift to the right (or to the left) of the array on the left.

As is emphasized in the middle arrays of FIG. 6, the result of having taken the two single shots will be to obtain actual measurement data for green for every single point. Moreover, as shown by the composite array at the bottom of FIG. 6, for the single color—red or blue—that needs to be interpolated at a given pixel, the interpolation procedure can draw on measurement data from all four nearest-neighbor elements and from two of the four next-nearest neighbors. For example, consider the element shown with the bold outline in FIG. 6. It has actual measurements for the luminous intensity of green and blue, and requires an interpolation to be done to determine the contribution that red will make to the composite image. Not only do six of the eight nearest- and next-nearest neighbor elements contain actual red data, but they also contain the red-to-green intensity ratio. In the present invention, it will be that data that will take dominance if its interpolated value at the element in question differs from the straight-forward interpolation of red. That is, the software used to "assemble" the composite image is written to ensure that outcome.

As described in the Summary, there are means provided in many digital cameras currently in use by which the light-sensitive array can be shifted by a single pixel. For the cameras having this feature, it can be used to adapt them to the present invention. For cameras without this capability, the Preferred Embodiment of the present invention utilizes a precision rotation of the digital camera about an axis passing through the principal point of its lens. This precision rotation can be understood by referring to FIG. 7 and FIG. 8.

Figure 7:
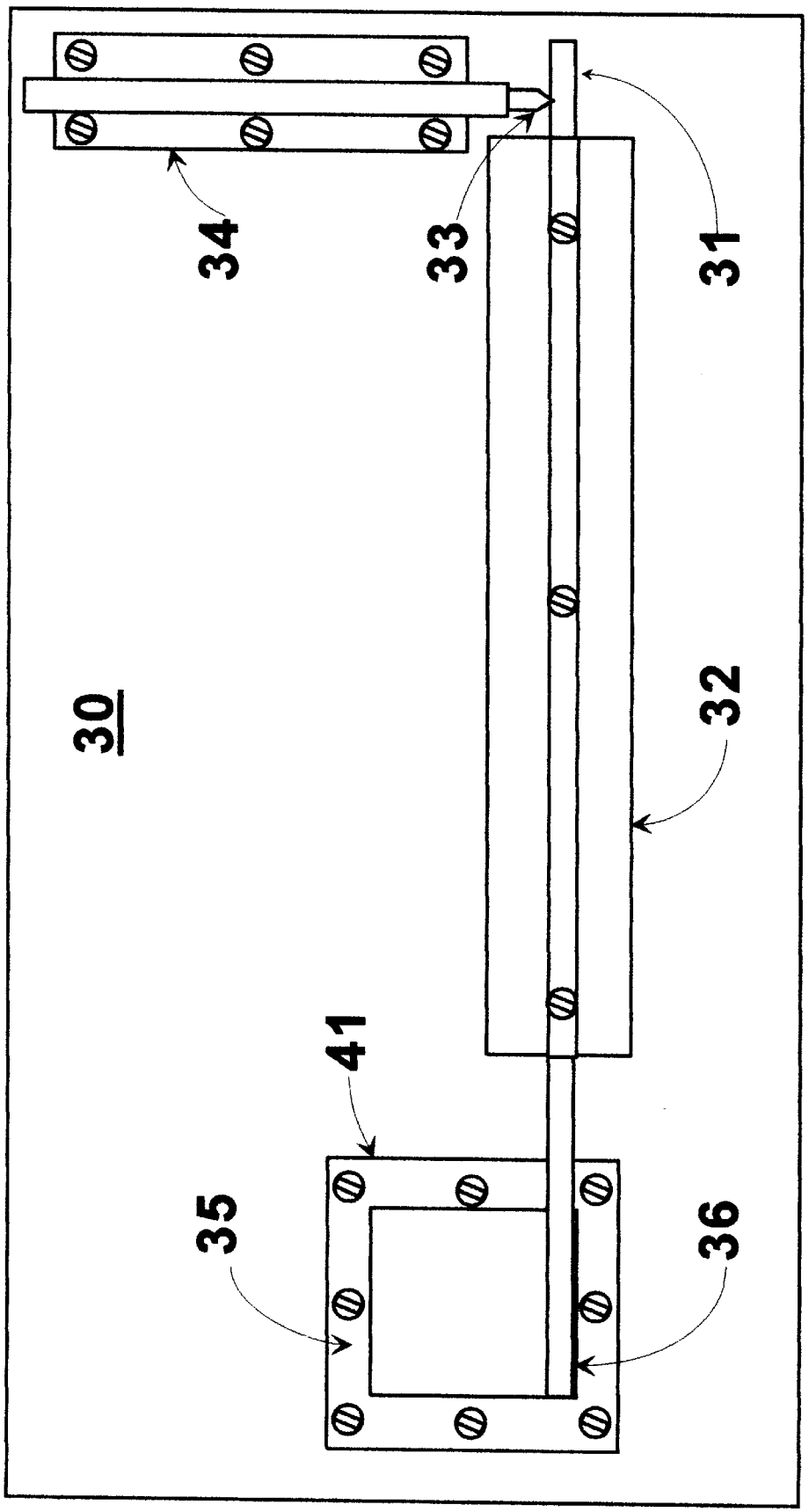
FIG. 7. A top view of the apparatus used for shifting the image on the CCD in accord with the preferred embodiment of the present invention.

FIG. 7 is a top view of the camera-rotation device of the Preferred Embodiment of the present invention. It includes a planar baseplate 30 onto which is affixed a pedestal 35 by means of a pedestal flange 41. To the pedestal 35 is affixed secured end 36 of a flexure stage 32. The affixing of the secured end 36 can be seen more clearly in the side view of the apparatus presented in FIG. 8. Said flexure stage 32 is preferably a piece of steel with a rectangular cross-section, though any rigid element of the appropriate dimensions will serve. It is on the flexure stage 32 that an existing digital camera 38 is placed preparatory to rotating the digital camera, indeed, preparatory to taking the first shot of a two-shot sequence. This is the apparatus that permits the present invention to be practiced with existing digital cameras that are not equipped with a means to move their light-sensing arrays independently. The apparatus shown in FIG. 7 and FIG. 8 is that on which such a camera is mounted during the desired two-shot photography in the Preferred Embodiment of the present invention.

Apart from its being affixed to the pedestal 35 by the secured end 36, the flexure stage 32 is free to move, subject only to its own rigidity. As shown in FIG. 7, a ram 33 is directed at right angles to the flexure stage 32 near a free end 31 of the flexure stage 32. Said ram 33 is itself contained in and controlled by a driver 37 that is affixed rigidly to the base 30 by a flange 34. Said ram 33 is butted up firmly against the free end 31. Preferably it is deployed so that it is already applying a stress to the free end 31 prior to the first shot being taken. As should be clear from FIG. 7 and FIG. 8, the application of stress to the free end 31 will cause the flexure stage 32 to bend. For small displacements, this bending can be treated as occurring about a certain bending axis 39.

Figure 8:
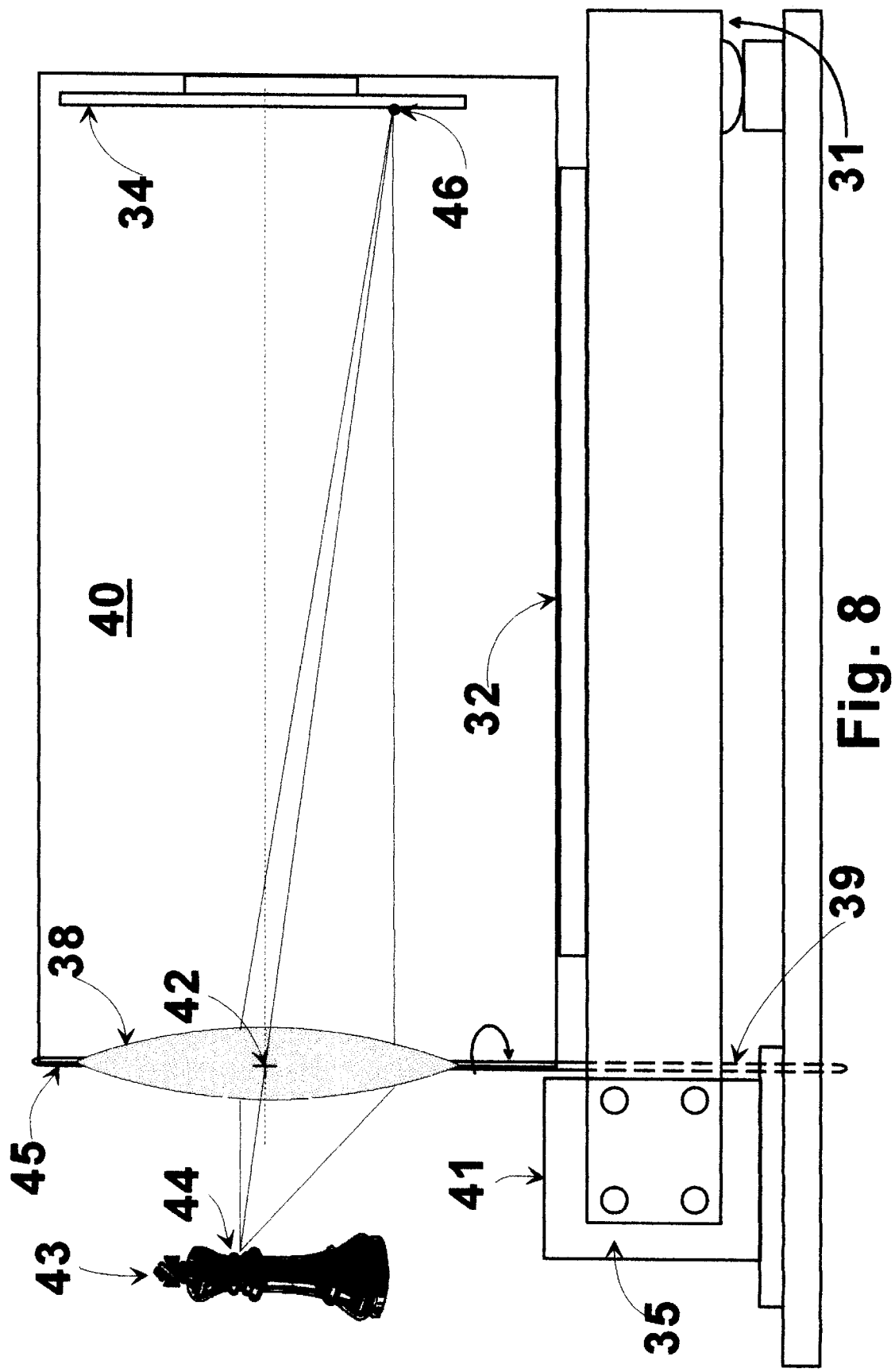
FIG. 8. A side view of the apparatus depicted in FIG. 7.

In addition to depicting a side view of the camera-rotation apparatus, FIG. 8 shows a side-view schematic of a digital camera 40 mounted on the flexure stage 32. It shows a lens 38 and a focal plane 34 of the camera. A representative point 44 of a representative object 43 is shown being focused as image point 46 on the focal plane 34. For the purpose of this discussion, the image point 46 will be a surrogate reference for the entire image focused on the focal plane 34.

Said camera 40 is rigidly attached to that part of the flexure stage 32 that lies to the right of the bending axis 39 as the apparatus is depicted in FIG. 8. Further, the camera 40 is mounted so that the bending axis 39 lies in a principal plane 45 of the lens 38 and indeed passes through a principal point 42 of the lens 38. This ensures that when the ram 33 pushes against the free end 31, the camera 40 will rotate about the bending axis 39. Since the bending axis 39 lies in the principal plane 45 and passes through the principal point 42, the rotation of the camera 40 will result in a simple lateral shift of the image point 46 on the focal plane 34. Said driver 37 is a closely controlled, precision device, preferably housing a piezoelectric cell coupled directly to said ram 33, wherein the piezoelectric cell is driven by an applied voltage. This permits the required lateral shift of the image point 46 between the first and second shots of the desired two-shot series. Ensuring that the rotation axis 39 passes through the principal point 42 of the lens 38 makes this preferred approach to the image shift remarkably free of the specific parameters of the particular camera chosen to be so used. Importantly, this Preferred Embodiment method of image shifting, ensures smooth shifting of the image point 46 across the focal plane 34, without concern of "slop" due to static or sliding friction.

This Preferred Embodiment description is intended to set out the best mode of practicing the invention presently known to the inventor, who does not intend thereby to limit the claimed invention in any way. Persons skilled in the art will be able to implement many different and perhaps better applications of the basic invention here disclosed.

I claim:

1. Digital camera apparatus for both single-shot and multiple-shot use, the apparatus comprising
   (a) a digital camera incorporating a lens with principal plane and principal point for focusing an image on an array of electronic light-sensing elements uniformly distributed across points of a focal plane, a color filter matrix for selecting from said array a first subarray sensitive to a first primary color, a second subarray sensitive to a second primary color, and a third subarray sensitive to a third primary color, where said first subarray includes approximately half of said light-sensing elements, said second subarray includes approximately one-quarter of said light-sensing elements, and said third subarray includes approximately one-quarter of said light-sensing elements,
   (b) means for shifting said image within said focal plane so that each of said points of said focal plane that had been occupied by a member of said first subarray are thereafter occupied by a member of said second subarray or a member of said third subarray,
   (c) means for capturing and electronically storing a first photograph of said image prior to said shifting and a second photograph subsequent to said shifting,
   (d) software means for electronically combining only said first photograph and said second photograph so as to produce a composite color photograph.

2. The apparatus as described in claim 1 wherein said software means uses intensity information for said first primary color obtained collectively in said first photograph and in said second photograph as a normalizing factor in producing said composite color photograph.

3. The apparatus as described in claim 2 wherein said first primary color is green, said second primary color is blue, and said third primary color is red.

4. The apparatus as described in claim 3 wherein said means for shifting is an electronic-shift control for moving said array with respect to said camera.

5. The apparatus as described in claim 3 wherein said means for shifting is a camera-rotation device to rotate said camera about a rotation axis passing through said principal point.

6. The apparatus as described in claim 5 where said camera-rotation device comprises a flexure stage element having a secured end, a free end, and a means to drive said free end laterally with respect to said secured end so as to bend said flexure stage element about a bending axis and wherein said camera is couplable to said flexure stage element so that said bending axis lies in said principal plane and passes through said principal point.

7. The apparatus as described in claim 6 where said means to drive is a ram controlled by a piezoelectric cell.

8. A digital camera and compositing circuit comprising a spatially-uniform array of light-sensitive elements extending over a focal plane of said camera, half of said elements being sensitive to green light (green pixels), one-quarter of said elements being sensitive to red light (red pixels), and one-quarter of said elements being sensitive to blue light (blue pixels), and where said elements are distributed so that a transverse move of said array within said focal plane by a distance equal to that between adjacent elements will move one of said green pixels into a location previously occupied by one of said red pixels or by one of said blue pixels, such that said camera can take a first photograph prior to said transverse move and a second photograph subsequent to said transverse move and said compositing circuit can produce through interpolation and normalization a composite color photograph made up of data captured in only said first photograph and said second photograph, wherein said normalization depends only on data collected by said green pixels.

9. Digital camera and compositing circuit as described in claim 8 wherein said array is mounted on a movable stage located at said focal plane and said transverse move is accomplishable by moving said stage with respect to said digital camera.

10. Digital camera and compositing circuit as described in claim 8 in combination with flexure stage apparatus capable of rotating said camera about an axis passing through a principal plane.

11. A method for performing both single-shot and multiple-shot digital photography with a single digital camera, said method comprising the steps of (a) selecting a digital camera that has a matrix array of photosensors on a stage such that roughly half of said photosensors are sensitive only to green light (green pixels), roughly one quarter are sensitive only to red light (red pixels), and roughly one quarter are sensitive only to blue light (blue pixels) and further such that said array of green pixels, red pixels, and blue pixels are deployed so that a first shift of said array by either a column or a row will result in each of said green pixels moving into a position occupied by one of said red pixels or one of said blue pixels prior to said first shift and that a second shift equal in direction and amount of said first shift will cause each of said green pixels to occupy a position occupied by one of said green pixels before said first shift and each of said red pixels to occupy a position occupied by one of said red pixels before said first shift and each of said blue pixels to occupy a position occupied by one of said blue pixels before said first shift, (b) firmly mounting said camera with respect to a scene to be photographed, (c) capturing and storing a first photograph of said scene with said camera, (d) moving said stage so that said array is shifted by one column or one row, (e) capturing and storing a second photograph of said scene with said camera, (f) electronically combining said first photograph with second photograph in order to produce a full color image a point corresponding to each said photosensor in said array, wherein said electronically combining includes an interpolation of red data for locations not occupied by a red pixel during either said first photograph or said second photograph and an interpolation of blue data for locations not occupied by a blue pixel during either said first photograph or said photograph, where said interpolation of red data and said interpolation of blue data are both carried out subject to normalization using data from said green pixels obtained sequentially in said first photograph and said second photograph.

* * * * *